United States Patent Office 3,485,649
Patented Dec. 23, 1969

3,485,649
HYDRAULIC CEMENT COMPOSITION
AND ADDITIVE
Thomas M. Kelly, Chagrin Falls, Richard B. Peppler, Cleveland Heights, and James A. Ray, Streetsboro, Ohio, assignors to Martin-Marietta Corporation, a corporation of Maryland
No Drawing. Filed Aug. 23, 1965, Ser. No. 481,952
Int. Cl. C04b 7/02, 13/02; C08h 17/68
U.S. Cl. 106—90
20 Claims

ABSTRACT OF THE DISCLOSURE

A hydraulic cement mix including portland cement aggregate and sufficient water to effect hydraulic setting of the cement. An additive is also present which comprises the product resulting from the processing of molasses and tobacco plant material. This processing may include a material having a general formula $N(ROR')_3$ such as triethanolamine.

---

This invention relates to additives for incorporation in hydraulic cement mixes, for example, portland cement concretes and mortars, and dry mixes for making such concretes and mortars, and to the resultant hydraulic cement mixes containing the additives.

It is known in the art that various plant derived products and carbohydrates will beneficiate concrete or mortar when employed as small percentage additions to the plastic mixes. For example, molasses, derived from sugar cane or sugar beets, is known in this respect. However, a frequent disadvantage in the use of such materials, particularly molasses, when employed in a dosage range necessary to effect the desired level of improvement in certain properties of the concrete or mortar, as for example, improvement in compressive strength, is that they at the same time effect a greater degree of retardation of the rate of hardening of the concrete or mortar than is desired. With use of any but small dosages of these materials, the retardation is so severe as to seriously reduce compressive strength, even at later ages. Thus the preferred dosage range of blackstrap molasses, as disclosed in U.S. Patent No. 2,311,290 is 0.01 to 0.1 percent of cement and it is noted that use of higher dosages causes loss in compressive strength of the concrete.

The present invention comprises the discovery that the pyrolytic treatment of tobacco plant material in an aqueous system with molasses yields a product which has in concrete or mortar substantially all the beneficial effects of untreated molasses, but in which the tendency to retard the rate of set thereof is significantly reduced, or even eliminated. In certain applications these products accelerate the rate of set of concrete even though neither by the treatment nor by subsequent addition has any accelerator known in the prior art been added.

The definition of the word "molasses" varies from one country to another and within the United States, varies from one industry to another. However, it refers to a mother liquor from which a sugar, usually sucrose, has been removed to the extent that is practical. Sucrose remaining in the molasses varies from about 30 percent for cane blackstrap to 50 percent for beet molasses. Reducing sugars will vary from a trace quantity in beet molasses to about 25 percent in "Barrel Syrup." Any of these materials are suitable for use within the scope of the present invention.

The preferred material of the present invention is the product resulting from heating some portion of the tobacco plant in any convenient concentration in a water solution together with molasses. The use of the tobacco plant alone or of extracts thereof is described in our co-pending U.S. patent application Ser. No. 481,902, filed Aug. 23, 1965, now U.S. 3,432,316, and the tobacco materials disclosed in this application are usable in this invention. The tobacco plant material may comprise any portion of the plant but for economic reasons the stem is preferred, and the stem is in its normal condition of having been subjected to some degree of natural or artificial curing. Prior grinding of the stem is desirable since it facilitates the reactiton with the molasses, but products of a similar nature are obtained whether the stems are previously ground or not.

Products within the scope of the present invention are secured by heating the tobacco plant material and the molasses in a preferred temperature range from about 100° C. to about 200° C. The conversion of the molasses is not very extensive if the reaction is conducted much below 100° C., whereas the organic matter is too severely degraded if the reaction is conducted about 200° C. However, such products heated or processed in the temperature range from room temperature to 100° C. are useful additives and lie within the scope of this invention, since some degree of chemical conversion of the constituents is involved. In such products prepared at 25° C., for example, the retardative property is completely removed, but the products are not substantially accelerating. Also included within the scope of the present invention is a class of products resulting from a similar treatment of tobacco plant material with molasses together with varying amounts of the types of materials known in the art and used in commercial admixtures however not used in a manner taught in the present invention. For example, a well-known class of such materials is represented by $N(ROR')_3$ where R is an alkyl or aryl derivative (that is an alkyl or aryl group minus one H) and R' is an alkyl or aryl group or H and the best known particular example is triethanolamine. That is, the invention comprises pyrolytically treated mixtures of tobacco and molasses, with or without materials such as triethanolamine.

Hence, it is an object of the present invention to provide a pyrolytic process whereby a tobacco-molasses combination may be treated to provide a product having unique properties when incorporated in concretes and mortars.

Another object of the invention is the provision of a novel additive for concrete and mortar to improve the characteristics thereof.

Another object is the provision of a superior additive for concrete and mortar producing results not hitherto obtainable.

Treatment of water slurries of tobacco plant material and molasses at temperatures near the boiling point of water may be effected in any convenient apparatus, but ucts were evaluated in concrete. While the examples cited a flask equipped with a reflux condenser is preferred since this precludes loss of the liquid phase during treatment. More severe treatment conditions which employ temperatures ranging upward to 180° C. or higher require use of a closed-system reactor, preferably with provision for continuous stirring, and with instrumentation to monitor pressure and temperature.

For the purpose of illustrating the teachings and advantages of the present invention either Burley air-cured, or Bright Leaf flue-cured tobacco stems were heated with a cattle-feed grade of blackstrap molasses. Three sets of weight proportions of constituents were employed, namely, 1:2, 1:1 and 2:1 of molasses:tobacco, respectively. These mixtures were heated with water in slurries containing 64 to 90 percent water in the range from 25° C. to 180° C. for 45 minutes and the resulting products refer to treatments for 45 minutes, lesser times of treatment produce similar effects. Also, lesser temperatures of treatment, down to and including room temperature, produce products which are similar in that the retardative property is lessened or removed.

The data below illustrate that aqueous mixtures of molasses and tobacco stems in the range of proportions of molasses to tobacco of 2:1 to 1:2, processed in the range of temperature from 25° C. to 180° C., yield products which at the dosages specified range in effect on rate of hardening from mild acceleration to mild retardation, while at the same time effecting significant water reduction and improvement in compressive strength. In securing these data, the entire product was employed in the concrete, but the indicated dosages are with respect to the soluble plus insoluble solids therein. While this is

| Mix No. | Additive | Percentage Addition of Additive [1] | Water, Gal./cu. yd. of Concrete | Air, Vol. percent of Concrete | Compressive Strength of Concrete, p.s.i. | | Rate of Hardening Relative to Plain Mix, Hrs. |
|---|---|---|---|---|---|---|---|
| | | | | | 7 days | 28 days | |
| 1 | None | | 37.7 | 1.7 | 2,700 | 4,310 | |
| 2 | 10% ground Bright Leaf Stems, 20% molasses and 70% H₂O cooked at 180° C. | .05 | 36.4 | 2.1 | 3,065 | 4,740 | −¼ |
| 3 | 10% ground Burley Stems, 20% molasses +70% H₂O cooked at 180° C. | .05 | 36.4 | 2.1 | 3,150 | 4,770 | −¼ |
| 4 | do | .10 | 35.1 | 3.1 | 3,150 | 4,865 | 0 |
| 5 | do | .20 | 33.4 | 4.6 | 3,320 | 4,880 | +¼ |
| 6 | None | | 37.5 | 1.8 | 2,565 | 4,155 | |
| 7 | 10% ground Burley Stems, 20% molasses +70% H₂O cooked at 100° C. | .05 | 35.9 | 2.2 | 3,145 | 4,775 | 0 |
| 8 | 10% ground Bright Leaf Stems, 20% molasses +70% H₂O cooked at 100° C.[2] | .05 | 34.8 | 3.2 | 3,110 | 4,750 | 0 |
| 9 | 10% ground Burley Stems, 10% molasses +80% H₂O cooked at 100° C. | .05 | 35.2 | 2.8 | 2,985 | 4,520 | 0 |
| 10 | 10% ground Bright Leaf Stems, 10% molasses +80% H₂O cooked at 100° C. | .05 | 35.0 | 3.2 | 3,035 | 4,815 | 0 |
| 11 | None | | 38.0 | 1.8 | 2,560 | 4,140 | |
| 12 | 10% ground Bright Leaf Stems, 20% molasses +70% H₂O cooked at 140° C. | .05 | 36.4 | 2.2 | 2,940 | 4,575 | 0 |
| 13 | do | .075 | 35.7 | 2.4 | 3,175 | 4,755 | 0 |
| 14 | do | .10 | 35.3 | 2.7 | 3,150 | 4,815 | +½ |
| 15 | None | | 38.2 | 2.0 | 2,495 | 4,140 | |
| 16 | 6.7% ground Bright Leaf stems, 3.3% molasses +90% H₂O cooked at 180° C. | .05 | 34.6 | 3.2 | 2,885 | 4,500 | −¼ |
| 17 | None | | 38.5 | 1.8 | 2,475 | 4,190 | |
| 18 | 12% Molasses +12% ground Bright Leaf Stems +76% H₂O cooked at 150° C. | .05 | 35.8 | 2.4 | 3,065 | 4,785 | −½ |
| 19 | do | .075 | 35.3 | 2.5 | 3,310 | 5,075 | −½ |
| 20 | do | .125 | 34.2 | 3.3 | 3,135 | 5,140 | −¼ |
| 21 | do | .15 | 34.5 | 3.7 | 3,255 | 5,125 | 0 |
| 22 | do | .20 | 33.6 | 4.1 | 3,370 | 5,115 | +½ |
| 23 | None | | 38.7 | 1.8 | 2,520 | 4,040 | |
| 24 | 18% Molasses +18% ground Bright Leaf Stems +64% H₂O cooked at 150° C. | .05 | 36.8 | 2.3 | 3,020 | 4,670 | 0 |
| 25 | do | .075 | 35.9 | 2.7 | 3,160 | 4,875 | −¼ |
| 26 | do | .10 | 35.0 | 3.3 | 3,310 | 4,965 | 0 |
| 27 | do | .125 | 34.5 | 3.6 | 3,285 | 5,050 | +¼ |
| 28 | do | .15 | 33.9 | 3.8 | 3,395 | 5,060 | +½ |
| 29 | None | | 38.2 | 1.8 | 2,755 | 4,190 | |
| 30 | 10% ground Burley Stems, 10% molasses +80% H₂O processed at 25° C. | .05 | 36.1 | 2.3 | 3,035 | 4,730 | −¼ |
| 31 | do | .10 | 35.3 | 3.0 | 3,155 | 4,920 | −⅛ |
| 32 | do | .15 | 34.8 | 3.5 | 3,320 | 5,020 | −⅛ |
| 33 | do | .20 | 33.9 | 4.2 | 3,255 | 5,020 | 0 |

[1] Solids by weight of cement.  [2] A plus value indicates retardation; a negative value, acceleration.

Plain concrete mixes were prepared and compared in a series with similar concrete mixes to which had been added various dosages of the products described above. In all similar concrete mixes, the same type and brand of cement was used, and the proportion and kind of coarse and fine aggregate were substantially the same. A sufficient amount of water was added to each mix to effect hydraulic setting of the cement and to produce concrete mixes of essentially the same consistency. Results are shown in the table above.

a convenient manner of use of these products since no filtration step is involved, they may also be filtered and only the soluble portion thereof employed in concrete. Under these conditions, similar results are obtained, as is illustrated by the data below, which were secured in the same manner of testing as is described above. In these examples the dosages are with respect to the soluble solids contained in the filtrate.

| Mix No. | Additive | Percentage Addition of Additive [1] | Water, Gal./cu. yd. of Concrete | Air, Vol. percent of Concrete | Compressive Strength of Concrete, p.s.i. | | Rate of Hardening Relative to Plain Mix, Hrs.[2] |
|---|---|---|---|---|---|---|---|
| | | | | | 7 days | 28 days | |
| 34 | None | | 37.2 | 2.3 | 2,495 | 4,100 | |
| 35 | The filtrate only from heating 6.7% ground Bright Leaf Stems, 3.3% molasses +90% H₂O at 180° C. | .05 | 34.5 | 3.3 | 2,960 | 4,590 | −½ |
| 36 | do | .075 | 33.6 | 3.9 | 3,055 | 4,820 | −½ |
| 37 | do | .10 | 33.0 | 4.4 | 3,135 | 4,770 | −¼ |

[1] Solids by weight of cement; see text above for composition of additive.  [2] A plus value indicates retardation; a negative value, acceleration.

While very effective additives are obtained by heating together aqueous mixtures of tobacco plant material and molasses, as previously illustrated, even more effective additives are obtained if the processing of these materials is conducted in the presence of materials previously defined and represented by the general formula $N(ROR')_3$. This will be demonstrated specifically by the use of triethanolamine. Additives containing these three constituents are prepared in the same manner as has been described for preparation of the additives containing only the two constituents.

Such additives, having a variety of relative proportions of constituents, were prepared as indicated in column 6, in 20 percent by weight aqueous slurries:

| Additive Designation | Weight Proportions | | | Temperature of Treatment [1], °C. |
|---|---|---|---|---|
| | Ground Bright Leaf Stems | Triethanolamine | Molasses | |
| A | 10 | 2 | 3 | 100 |
| B | 10 | 2 | 3 | 150 |
| C | 10 | 2 | 3 | 180 |
| D | 10 | 2 | 6 | 100 |
| E | 10 | 2 | 6 | 150 |
| F | 10 | 2 | 6 | 180 |
| G | 5 | 2 | 6 | 100 |
| H | 5 | 2 | 6 | 150 |
| I | 5 | 2 | 6 | 180 |
| J | 10 | 1 | 3 | 100 |
| K | 10 | 1 | 3 | 150 |
| L | 10 | 1 | 3 | 180 |
| M | 10 | 1 | 6 | 100 |
| N | 10 | 1 | 6 | 150 |
| O | 10 | 1 | 6 | 180 |
| P | 10 | 1 | 3 | 25 |

[1] The mixtures were held for 45 to 60 minutes at the indicated temperature.

These additives were evaluated in the same manner as is described above, with results as follows:

| Mix No. | Additive | Percentage Addition of Additive [1] | Water, Gal./cu. yd. of Concrete | Air, Vol. Percent of Concrete | Compressive Strength of Concrete, p.s.i. | | Rate of Hardening Relative to Plain Mix, Hrs.[2] |
|---|---|---|---|---|---|---|---|
| | | | | | 7 days | 28 days | |
| 38 | None | | 37.9 | 1.7 | 2,470 | 4,120 | |
| 39 | B | .05 | 36.0 | 2.4 | 3,055 | 4,675 | −½ |
| 40 | None | | 38.2 | 1.8 | 2,580 | 4,130 | |
| 41 | B | .10 | 34.7 | 3.1 | 3,405 | 4,975 | −1½ |
| 42 | B | .15 | 33.6 | 3.8 | 3,510 | 5,000 | −1 |
| 43 | A | .10 | 34.9 | 3.5 | 3,255 | 4,760 | −1¼ |
| 44 | A | .15 | 33.5 | 4.4 | 3,530 | 4,980 | −⅞ |
| 45 | C | .10 | 34.0 | 4.1 | 3,230 | 4,785 | −1¾ |
| 46 | C | .15 | 32.6 | 5.3 | 3,400 | 4,760 | −1¾ |
| 47 | None | | 38.4 | 1.7 | 2,370 | 3,965 | |
| 48 | D | .05 | 35.8 | 2.3 | 3,005 | 4,750 | −¼ |
| 49 | D | .10 | 34.4 | 3.1 | 3,225 | 4,980 | −½ |
| 50 | D | .15 | 33.5 | 3.6 | 3,460 | 5,105 | −¼ |
| 51 | None | | 37.9 | 1.7 | 2,470 | 4,120 | |
| 52 | E | .05 | 36.2 | 2.3 | 3,060 | 4,670 | −½ |
| 53 | E | .10 | 35.6 | 3.0 | 3,175 | 4,800 | −½ |
| 54 | E | .15 | 34.9 | 3.7 | 3,210 | 4,735 | −⅛ |
| 55 | F | .05 | 35.8 | 3.0 | 2,965 | 4,540 | −½ |
| 56 | F | .10 | 34.9 | 4.2 | 3,080 | 4,675 | −1¼ |
| 57 | F | .15 | 33.7 | 5.5 | 3,115 | 4,595 | −1 |
| 58 | None | | 38.5 | 1.7 | 2,465 | 4,085 | |
| 59 | G | .05 | 36.4 | 2.7 | 3,095 | 4,900 | −½ |
| 60 | G | .075 | 35.5 | 2.9 | 3,295 | 5,040 | −½ |
| 61 | G | .10 | 35.1 | 3.5 | 3,450 | 5,165 | 0 |
| 62 | None | | 37.4 | 1.9 | 2,775 | 4,365 | |
| 63 | I | .05 | 35.2 | 3.2 | 3,205 | 4,880 | −⅜ |
| 64 | I | .075 | 34.2 | 3.9 | 3,415 | 4,945 | −1½ |
| 65 | I | .10 | 33.4 | 4.8 | 3,370 | 4,910 | −1½ |
| 66 | I | .15 | 32.2 | 5.9 | 3,465 | 4,860 | −1½ |
| 67 | H | .05 | 35.6 | 2.4 | 3,245 | 4,945 | −½ |
| 68 | H | .075 | 35.1 | 2.7 | 3,485 | 5,000 | −½ |
| 69 | H | .10 | 34.3 | 3.3 | 3,555 | 5,185 | −½ |
| 70 | H | .15 | 33.8 | 4.2 | 3,635 | 5,250 | 0 |
| 71 | None | | 38.7 | 1.7 | 2,405 | 3,965 | |
| 72 | J | .05 | 37.5 | 2.9 | 3,030 | 4,755 | −½ |
| 73 | J | .075 | 36.9 | 3.1 | 3,050 | 4,745 | −½ |
| 74 | J | .10 | 35.7 | 3.7 | 3,245 | 4,985 | −½ |
| 75 | J | .15 | 34.9 | 4.4 | 3,325 | 5,010 | −¼ |
| 76 | None | | 37.5 | 1.9 | 2,620 | 4,145 | |
| 77 | K | .05 | 35.3 | 2.5 | 3,100 | 4,735 | −½ |
| 78 | K | .075 | 34.3 | 3.1 | 3,200 | 4,885 | −¼ |
| 79 | K | .10 | 34.1 | 3.2 | 3,360 | 4,970 | −½ |
| 80 | K | .15 | 33.4 | 4.1 | 3,330 | 4,940 | −½ |
| 81 | L | .05 | 34.8 | 2.5 | 3,050 | 4,735 | −½ |
| 82 | L | .075 | 34.0 | 3.3 | 3,245 | 4,865 | −½ |
| 83 | L | .10 | 33.5 | 4.0 | 3,195 | 4,760 | −¾ |
| 84 | L | .15 | 32.4 | 5.3 | 3,240 | 4,815 | −¾ |
| 85 | None | | 37.8 | 1.6 | 2,450 | 4,140 | |
| 86 | M | .05 | 36.7 | 2.3 | 2,835 | 4,585 | 0 |
| 87 | M | .075 | 36.0 | 2.6 | 3,085 | 4,770 | 0 |
| 88 | M | .10 | 35.5 | 3.1 | 3,150 | 4,820 | 0 |
| 89 | M | .15 | 34.6 | 3.8 | 3,185 | 4,855 | 0 |
| 90 | None | | 37.3 | 1.9 | 2,665 | 4,230 | |
| 91 | N | .05 | 35.4 | 2.3 | 3,120 | 4,725 | −½ |
| 92 | N | .075 | 34.8 | 2.8 | 3,240 | 4,995 | −½ |
| 93 | N | .10 | 34.2 | 3.5 | 3,410 | 4,950 | −¼ |
| 94 | N | .15 | 33.5 | 4.1 | 3,430 | 5,000 | −¼ |
| 95 | O | .05 | 35.1 | 2.8 | 3,135 | 4,735 | −¾ |
| 96 | O | .075 | 34.5 | 3.6 | 3,180 | 4,895 | −¾ |
| 97 | O | .10 | 33.7 | 4.1 | 3,265 | 4,860 | −¾ |
| 98 | O | .15 | 33.0 | 5.0 | 3,195 | 4,630 | −1¾ |
| 99 | None | | 38.7 | 1.7 | 2,405 | 3,965 | |
| 100 | P | .05 | 37.9 | 2.6 | 2,805 | 4,415 | −¼ |
| 101 | P | .075 | 37.2 | 3.1 | 2,910 | 4,665 | −¼ |
| 102 | P | .10 | 36.4 | 3.6 | 3,135 | 4,800 | −¼ |
| 103 | P | .15 | 35.9 | 4.6 | 3,190 | 4,775 | −½ |

[1] Solids by weight of cement.
[2] A plus value indicates retardation; a negative value, acceleration.

In securing these data, the entire product was used in the concrete, but the indicated dosages are with respect to the soluble plus insoluble solids therein. The above data illustrate that additives prepared from aqueous slurries of molasses, tobacco plant material, and triethanolamine, heated in the temperature range from 25° C. to 180° C., and having weight ratios of molasses to tobacco plant material in the range of 0.30 to 1.20 and proportions of triethanolamine with respect to the sum of all constituents in the range of .059 to .154, effect significant water reduction and improvement to compressive strength, yet are non-retarding or are accelerating in effect on rate of hardening of the concrete. It will be apparent to those skilled in the art that these products, some of which are accelerated in the range of 1 to 2 hours, could be employed at much higher dosages, which would yield still greater benefits to concrete, without fear of excessive retardation. Dosages up to 0.50 percent of cement or greater may be so employed, for both the 2- and the 3-component products. It will also be apparent that inclusion of other additives known in the art may permit still greater dosages to be used, on the order of 1.0 percent. It is preferred to use at least .05 percent of these materials based on the weight of cement but benefits can be derived with the use of as little as .01 percent.

In the above examples, the whole products resulting from processing the ingredients were employed in the concrete. However, as in the case of products not containing the triethanolamine, and as illustrated earlier, the soluble material only may be obtained by filtration and employed in the concrete.

While the foregoing description of the invention herein describes the use of the material of the present invention in its preferred dosage range, in mixes combined with cement, aggregate, and sufficient water to effect hydraulic setting of the cement and produce a workable plastic mix, it should be understood by those skilled in the art that still other materials in the nature of additives may be included in the cement mixes for the purpose for which they are normally employed. Such other additives, for example, may be air-entraining agents, air-detraining agents, pozzoulanic materials, fly-ash, coloring materials, and water repellents. Other well-known additive materials may be used to accomplish their normal and intended function.

While the invention has been described and illustrated by reference to various specific materials and procedures, it is to be understood that the invention is not restricted to the particular materials and procedures selected for that purpose. Numerous variations in such details can be employed, as will be appreciated by those skilled in the art.

What is claimed is:

1. A hydraulic cement mix including portland cement, aggregate, and having had added thereto sufficient water to effect hydraulic setting of the cement, and an additive, said additive comprising the product resulting from the processing of molasses and tobacco plant material, said additive being present in an amount sufficient to increase the strength of the mix when hardened.

2. A hydraulic cement mix including portland cement, aggregate, and having had added thereto sufficient water to effect hydraulic setting of the cement, and an additive, said additive comprising the product resulting from the processing of molasses and tobacco plant material, said additive being present in an amount in the range of from .05 to .50 percent based on the weight of cement.

3. A hydraulic cement mix including portland cement, aggregate, and having had added thereto sufficient water to effect hydraulic setting of the cement, and an additive, said additive comprising the product resulting from the processing of molasses and tobacco plant material, said additive being present in an amount in the range of from .01 to 1.0 percent based on the weight of cement.

4. A hydraulic cement mix including portland cement, aggregate, and having had added thereto sufficient water to effect hydraulic setting of the cement, and an additive, said additive comprising the product resulting from the processing of an aqueous mixture of molasses and tobacco plant material in the temperature range of from about 25 degrees C. to about 200 degrees C., said additive being present in an amount in the range of from .05 to .50 percent based on the weight of cement.

5. A hydraulic cement mix including portland cement, aggregate, and having had added thereto sufficient water to effect hydraulic setting of the cement, and an additive, said additive comprising the product resulting from the processing of an aqueous mixture of molasses and tobacco plant material in the temperature range of from about 100 degrees C. to about 200 degrees C. said additive being present in an amount in the range of from .05 to .50 percent based on the weight of cement.

6. A hydraulic cement mix including portland cement, aggregate, and having had added thereto sufficient water to effect hydraulic setting of the cement, and an additive, said additive comprising the product resulting from the processing of an aqueous mixture of molasses and tobacco plant material in the temperature range of from about 25 degrees C. to about 200 degrees C., said additive being present in an amount in the range of from .01 to 1.0 percent based on the weight of cement.

7. A hydraulic cement mix including portland cement, aggregate, and having had added thereto sufficient water to effect hydraulic setting of the cement, and an additive, said additive comprising the product resulting from the processing of an aqueous mixture of molasses and tobacco plant material in the temperature range of from about 100 degrees C. to about 200 degrees C., said additive being present in an amount in the range of from .01 to 1.0 percent based in the weight of cement.

8. A hydraulic cement mix including portland cement, aggregate, and having had added thereto sufficient water to effect hydraulic setting of the cement, and an additive, said additive comprising the product resulting from the processing of molasses, tobacco plant material and a material having the general formula $N(ROR')_3$ wherein R is an alkyl or aryl derivative and R' is an alkyl or aryl group or hydrogen and N represents nitrogen and O represents oxygen, said additive being present in an amount sufficient to increase the strength of the mix when hardened.

9. A hydraulic cement mix as claimed in claim 8 wherein said material having the general formula $N(ROR')_3$ is triethanolamine.

10. A hydraulic cement mix including portland cement, aggregate, and having had added thereto sufficient water to effect hydraulic setting of the cement, and an additive, said additive comprising the product resulting from the processing of molasses, tobacco plant material and a material having the general formula $N(ROR')_3$ wherein R is an alkyl or aryl derivative and R' is an alkyl or aryl group or hydrogen and N represents nitrogen and O represents oxygen, said additive being present in an amount in the range of from .05 to .50 percent based on the weight of cement.

11. A hydraulic cement mix as claimed in claim 10 wherein said material having the general formula $N(ROR')_3$ is triethanolamine.

12. A hydraulic cement mix including portland cement, aggregate, and having had added thereto sufficient water to effect hydraulic setting of the cement, and an additive, said additive comprising the product resulting from the heating of molasses, tobacco plant material and a material having the general formula $N(ROR')_3$ wherein R is an alkyl or aryl derivative and R' is an alkyl or aryl group or hydrogen and N represents nitrogen and O represents oxygen, said additive being present in an amount in the range of from .01 to 1.0 percent based on the weight of cement.

13. A hydraulic cement mix as claimed in claim 12 wherein said material having the general formula $N(ROR')_3$ is triethanolamine.

14. A hydraulic cement mix including portland cement, aggregate, and having had added thereto sufficient water to effect hydraulic setting of the cement, and an additive, said additive comprising the product resulting from the processing of an aqueous mixture of molasses, tobacco plant material, and a material having the general formula $N(ROR')_3$ wherein R is an alkyl or aryl derivative and R' is an alkyl or aryl group of hydrogen and N represents nitrogen and O represents oxygen, in the temperature range of from about 25 degrees C. to about 200 degrees C., said additive being present in an amount in the range of from about .01 to 1.0 percent based on the weight of cement.

15. A hydraulic cement mix as claimed in claim 14 wherein said material having the general formula $N(ROR')_3$ is triethanolamine.

16. A hydraulic cement mix including portland cement, aggregate, and having had added thereto sufficient water to effect hydraulic setting of the cement, and an additive, said additive comprising the product resulting from the processing of an aqueous mixture of molasses, tobacco plant material, and a material having the general formula $N(ROR')_3$ wherein R is an alkyl or aryl derivative and R' is an alkyl or aryl group of hydrogen and N represents nitrogen and O represents oxygen, in the temperature range of from about 100 degrees C. to about 200 degrees C., said additive being present in an amount in the range of from about .01 to 1.0 percent based on the weight of cement.

17. A hydraulic cement mix as claimed in claim 16 wherein said material having the general formula $N(ROR')_3$ is triethanolamine.

18. As an additive for hydraulic cement mixes, a composition comprising the product resulting from the processing of molasses and tobacco plant material in the temperature range of from about 25 degrees C. to about 200 degrees C.

19. As an additive for hydraulic cement mixes, a composition comprising the product resulting from the processing of molasses, tobacco plant material and a material having the general formula $N(ROR')_3$ wherein R is an alkyl or aryl derivative and R' is an alkyl or aryl group or hydrogen and N represents nitrogen and O represents oxygen, in the temperature range of from about 25 degrees C. to about 200 degrees C.

20. As an additive for hydraulic cement mixes a composition comprising the product resulting from the processing of molasses, tobacco plant material and triethanolamine, in the temperature range of from about 25 degrees C. to about 200 degrees C.

References Cited

UNITED STATES PATENTS

| | | | |
|---|---|---|---|
| 2,188,767 | 1/1940 | Cannon et al. | 106—90 |
| 2,437,842 | 3/1948 | Uhler | 106—90 |
| 2,783,122 | 2/1957 | Hoekje | 106—90 |
| 3,332,791 | 7/1967 | Steinberg et al. | 106—92 |

JAMES E. POER, Primary Examiner

U.S. Cl. X.R.

106—315, 314, 97, 92